Figure 1:
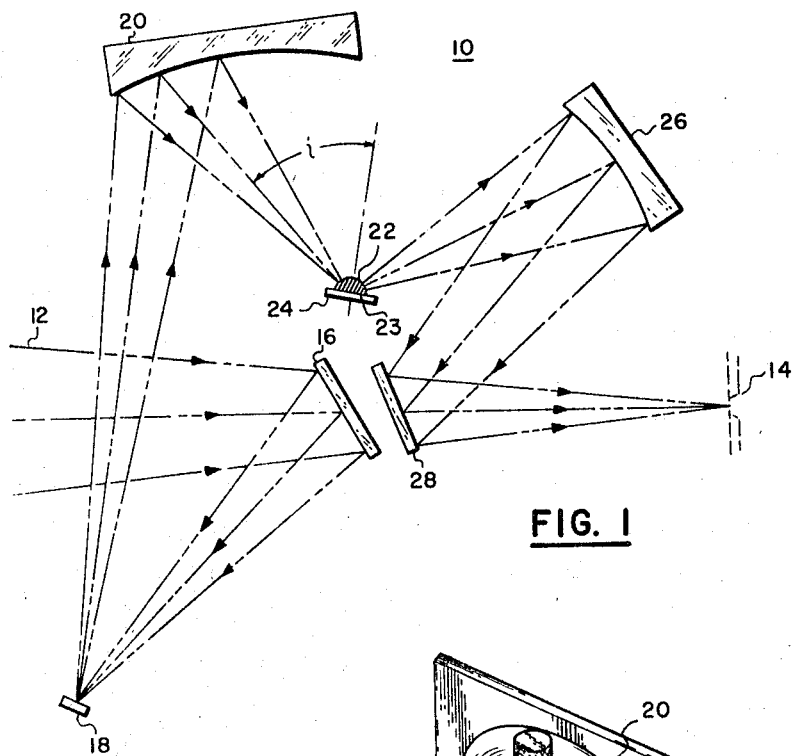

March 15, 1966   B. SHERMAN ETAL   3,240,111
ATTENUATED TOTAL REFLECTION ATTACHMENT FOR SPECTROPHOTOMETERS
Filed Nov. 13, 1962

INVENTOR.
BENNETT SHERMAN
DENNIS R. KATONA
BY
ATTORNEY

United States Patent Office 3,240,111
Patented Mar. 15, 1966

3,240,111
ATTENUATED TOTAL REFLECTION ATTACHMENT FOR SPECTROPHOTOMETERS
Bennett Sherman, Elmhurst, N.Y., and Dennis R. Katona, East Norwalk, Conn., assignors to Barnes Engineering Company, Stamford, Conn., a corporation of Delaware
Filed Nov. 13, 1962, Ser. No. 236,996
1 Claim. (Cl. 88—14)

This invention relates to the chemical analysis of materials by means of infrared absorption spectrum, and more particularly to an attenuated total reflection attachment for a spectrophotometer which adapts the spectrophotometer to analyze samples of extremely small area.

The application of attenuated total reflectance to the study of infrared absorption spectrum are well known. By this method a beam of radiation is passed into a prism, and is totally reflected from a back, flat face of the prism. Some of the energy of the radiation escapes from the totally reflecting surface and is returned into the prism and reflected therefrom. By placing a material or sample to be examined in contact with the reflecting surface which has an index of refraction less than that of the prism, the energy which escapes the prism is selectively absorbed by the material and returned into the prism. The infrared absorption spectrum thus obtained, which is reflected out of the prism, may be studied in a spectrophotometer.

Commercial spectrophotometers are generally not suited for utilizing the attenuated total reflection concept in the examination of the chemical properties of various materials. This is particularly true with respect to very small samples and to the study of materials which have refractive indexes which approach that of the totally reflecting surface.

Accordingly, it is the object of this invention to provide an attenuated total reflectance attachment for a spectrophotometer which permits the chemical analysis of samples whose areas are extremely small.

Another object of this invention is to provide an attenuated total reflection attachment for a spectrophotometer in which the angle of incidence of the radiation in the sample can be varied to allow the analysis of a sample having an index of refraction which approaches that of the total reflectance prism.

Another object of this invention is to provide an attenuated total reflectance attachment for a spectrophotometer which uses a combination of plain and concave spherical mirrors having uniform high reflectance throughout the infrared spectral region, and which are so arranged to minimize any spherical aberrations inherent in optical systems of this type.

Another object of this invention is to provide an attachment for a spectrophotometer which extends the use of the spectrophotometer to the chemical analysis of very small samples at a fraction of its total cost.

In carrying out this invention in an illustrative embodiment thereof, an attenuated total reflectance attachment for a spectrophotometer is provided having a total internal reflectance means with a flat surface thereon to which a sample which is to be studied may be positioned. A source of converging incident radiation from the spectrophotometer is imaged on the total internal reflectance means by a first optical means with a reduction in size. A second optical means is provided for reconverging and focusing the radiation from the total internal reflectance means. Means are also provided for varying the angular position of the first optical means and the total internal reflectance means simultaneously in order to vary the angle of incidence of the radiation being applied to the sample.

Figure 2:
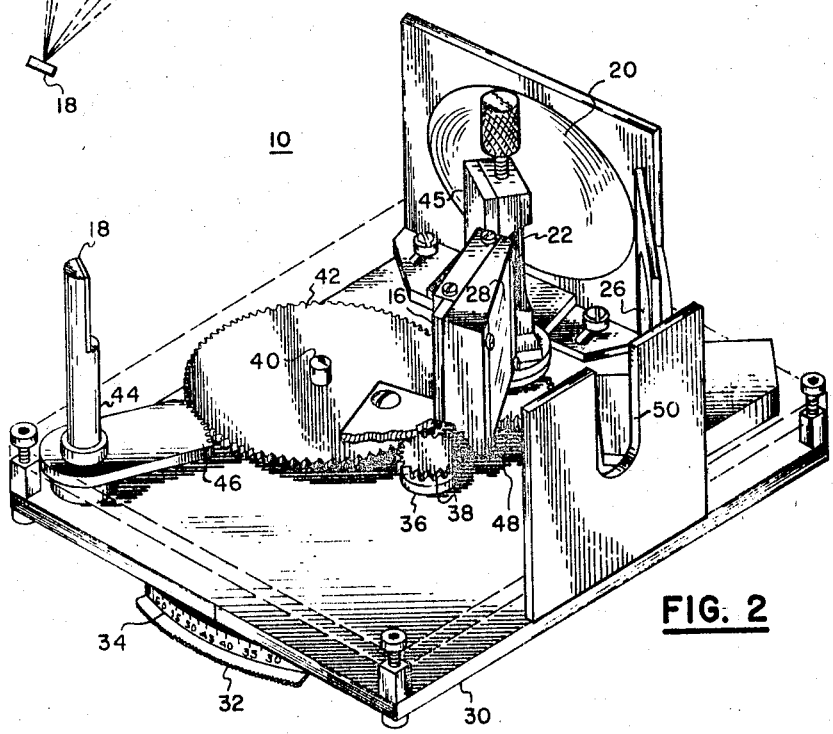

The invention, both as to organization and method of operation, together with further objects and advantages thereof, may best be understood by reference to the following description taken in connection with the accompanying drawings, in which:

FIG. 1 is a schematic diagram of the optical arrangement utilized in the attenuated total reflection attachment for a spectrophotometer embodied in this invention, FIG. 2 shows an isometric view with parts broken away and the cover removed of the attenuated total reflection attachment embodied in this invention.

Referring now to FIG. 1, the attenuated total reflection attachment is generally referred to with the reference character 10. A source of converging incident radiation 12 which is found in infrared transmission spectrophotometers and would normally converge and focus upon a mechanical input slit 14 of a spectrophotometer (not shown) is reflected by a first plane mirror 16. The plane mirror 16 directs the radiation 12 to a reimaging mirror 18. The radiation 12 is redirected by the reimaging mirror 18 to a first focusing mirror 20 without changing its divergence. An image of the reimaging mirror 18 is formed by the focusing mirror 20 upon an attenuated total internal reflectance means 22. The total internal reflectance means or prism 22 is shown having a hemicylindrical shape and may be made of any suitable material for providing total internal reflection such as KRS-5, KRS-6, silver chloride, silicon, germanium, lead chloride, etc. The prism 22 is characterized by having a flat total reflectance surface 23 to which a sample 24 may be positioned or affixed for examination by the attenuated total internal reflectance principle. The reimaging mirror 18 and the concave spherical mirror 20 are spaced to produce a reduction in size of the image of reimaging mirror 18 on the prism 22 by approximately 2½ to 1 in order that smaller samples may be analyzed by the attenuated total internal reflectance principle.

After attenuated total internal reflectance takes place in the prism 22, the diverging radiation therefrom is received by a second concave spherical focusing mirror 26. The second focusing mirror 26 is positioned to reconverge the radiation which, when finally redirected by a second plane mirror 28, comes to a focus on the input slit 14 of a spectrophotometer.

The attenuated total reflectance attachment 10 employs a combination of plane and concave spherical mirrors as described in FIG. 1 having uniform high reflectance throughout the infrared spectral region. In order to correct as far as practical for any spherical aberrations which are present due to the spherical concave focusing mirrors 20 and 26, these mirrors are constructed with the same radius and are positioned in opposing relationship such that the spherical aberrations produced by one are opposed and corrected by the other to minimize this effect when the radiation reaches the input slit 14.

In FIG. 1 the angle of incidence $i$ of the radiation 12 is shown as being approximately 60°, which of course is also the angle of reflection from the attenuated total reflectance prism 22. This angle may be quite suitable for examination of a sample having an index of refraction which is only slightly less than that of the index of refraction of the prism 22. However, as the index of refraction of the sample 24 under examination is much less than the index of the lens or prism 22 then a smaller angle of incidence is advantageous in order to obtain a useable spectral pattern. By suitably varying the angle of incidence of the radiation on the total internal reflectance prism 22 the effective depth of penetration into the sample under analysis may be varied. Accordingly, by being able to vary the angle of incidence of the radiation on the prism 22, the examination of a greater variety of samples having different indexes of refraction is allowable.

One method of varying the angle of incidence and reflection from an attenuated total internal reflection device is shown in FIG. 2. The total attenuated reflection attachment 10 has a base 30 to which an angular control dial 34 and a knob 32 are mounted. An angle control gear 38 mounted upon shaft 36 is driven by rotation of the control knob 32. A sample holder 45 which also houses the attenuated total reflectance prism 22 is mounted for rotation on a sample holder gear 48. The reimaging mirror 18 is mounted on a shaft 44 which is driven by a gear sector 46. An idler gear 42 rotatably mounted to the base 30 by a shaft 40 meshes with the angle control gear 38, the gear 46 and the sample holder gear 48. Accordingly, the idler gear 42 drives the sample holder gear 48 and the gear 46 at the same time in a linear fashion in response to a rotation of the angle control gear 38 when the knob 32 is rotated. The gears 46 and 48 have pitch diameters which are selected so that the angle of rotation of the reimaging mirror and the angle of rotation of the sample holder 45, compensate each other, so that the radiation leaving the prism 20 and approaching the second focusing mirror 26 does not shift in position or angle. Therefore, the incident radiation which is reflected from the prism 22 comes to a focus through an output aperture 50 of the attachment 10 upon the slit 14 of the spectrophotometer without movement or shift of focus even though the angle of incidence and reflection at the attenuated total reflectance sample holder 45 have been varied.

The attenuated total reflectance attachment 10 provides an angle of incidence upon the attenuated total reflectance prism 22 which may be varied from as little as 30° to as much as 60°. This particular range may be varied in some instances but is utilized in the illustrated embodiment as it is the one that can most practically be used in attenuated total reflection applications. By providing a range of angles, the attachment expands substantially the types of samples which may be analyzed. To utilize a particular incidence angle of the infrared radiation impinging upon the sample holder, the operator need merely rotate the angle control dial and knob. An attachment has thus been provided which substantially expands the usefulness of spectral photometers now in service at a fraction of their original cost.

Other types of gear trains or drive means may be employed so long as the reimaging mirror 18 and prism 22 are varied at the same time, and in accordance with the above noted procedure.

Since other modifications vary to fit particular operating requirements and environments it will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent of the United States is:

An attenuated total reflection attachment for a spectrophotometer which provides a source of converging incident radiation and an input slit, said attachment comprising (a) a first plane mirror receiving said radiation, a reimaging mirror, a first focusing mirror, a total internal reflection prism having a flat surface on which a sample to be studied may be positioned, said first plane mirror focusing said radiation on said reimaging mirror, said first focusing mirror forming an image of said reimaging mirror of reduced size on said total internal reflection prism, (b) a second focusing mirror which produces aberrations opposed to those of said first focusing mirror for minimizing the effects of such aberration at an input slit of a spectrophotometer, a second plane mirror, said second focusing mirror receiving diverged radiation from said prism and reconverging said radiation which is reflected from said second plane mirror to a focus on said input slit, and (c) means for rotating said reimaging mirror and said total internal reflection prism simultaneously to controllably vary the angle of incidence and reflection of radiation in said prism while the focus of the radiation on the input slit is being maintained.

References Cited by the Examiner
UNITED STATES PATENTS

| | | | |
|---|---|---|---|
| 2,425,399 | 8/1947 | Sachtleben | 88—14 |
| 2,633,052 | 3/1953 | Vieweg | 88—14 |
| 2,982,168 | 5/1961 | Svensson | 88—14 |
| 3,048,080 | 8/1962 | White | 88—14 |
| 3,157,788 | 11/1964 | Roche | 88—14 X |

OTHER REFERENCES

C.I.C. Newsletter, "Micro Attenuated Total Reflection Attachment," No. 17, July-August 1962, page 1.

Fahrenfort: "Attenuated Total Reflection," Spectrochimica Acta, volume 17, No. 7, August 1961, page 704.

JEWELL H. PEDERSEN, *Primary Examiner.*